(12) United States Patent
Gong

(10) Patent No.: US 10,749,446 B2
(45) Date of Patent: Aug. 18, 2020

(54) VIRTUAL SYNCHRONOUS GENERATOR SYSTEM AND METHOD WITH VIRTUAL INERTIA CONTROL

(71) Applicant: GENERAL ELECTRIC COMPANY, Schenectady, NY (US)

(72) Inventor: Maozhong Gong, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 37 days.

(21) Appl. No.: 16/238,516

(22) Filed: Jan. 2, 2019

(65) Prior Publication Data

US 2020/0212823 A1 Jul. 2, 2020

(51) Int. Cl.
*H02M 7/5387* (2007.01)
*H02J 3/38* (2006.01)

(52) U.S. Cl.
CPC ......... *H02M 7/53871* (2013.01); *H02J 3/385* (2013.01)

(58) Field of Classification Search
CPC ....... H02M 3/335–3376; H02M 7/757; H02M 7/515; H02M 7/797; H02M 7/44;
(Continued)

(56) References Cited

U.S. PATENT DOCUMENTS 8,705,256 B2 * 4/2014 O'Brien ................ H02J 3/383
363/131
8,848,404 B2 * 9/2014 Tan ....................... H02M 7/515
363/140

(Continued)

FOREIGN PATENT DOCUMENTS

CN 105680479 A 6/2016
CN 106549417 A 3/2017
CN 106708163 A 5/2017

OTHER PUBLICATIONS

Torres et al., "Non-linear control of a grid-connected multi-cell photovoltaic inverter that operates under variable temperature and irradiance", 2015 IEEE International Conference on Industrial Technology (ICIT), pp. 2855-2862, Seville, Mar. 2015.

Xin et al., "Study on the control of photovoltaic inverter based on virtual synchronous generator", 2016 IEEE 11th Conference on Industrial Electronics and Applications (ICIEA), pp. 1612-1615, Hefei, Jun. 2016.

(Continued)

*Primary Examiner* — Thienvu V Tran
*Assistant Examiner* — Nusrat Quddus
(74) *Attorney, Agent, or Firm* — Buckley, Maschoff & Talwalkar LLC

(57) ABSTRACT

A virtual synchronous generator device disclosed. The device includes an inverter and inverter controller having a power control portion, a power reserve portion, a power point tracking control portion, and a virtual inertia control portion. The power reserve portion determines an amount of power to be reserved and sends a signal, indicative of the determined amount of power to the power point tracking controller. The power point tracking controller determines a power point that is less than a MPP, and provides a signal to the power control portion indicative of the determined power point. The inertia control portion determines a virtual inertia and provides a signal indicative of the virtual inertia to the power control portion. The power control portion provides a power control signal to the inverter based on the power point tracking signal and the inertia command signal.

20 Claims, 7 Drawing Sheets

(58) Field of Classification Search
CPC ...... H02M 7/537; H02M 7/5387; H02M 7/48; H02J 1/00; H02J 3/383; H02J 3/385; H02J 3/384; H02J 7/34; H02J 7/35; H02J 7/345
See application file for complete search history.

(56) References Cited

U.S. PATENT DOCUMENTS

| | | | | |
|---|---|---|---|---|
| 8,982,592 | B2* | 3/2015 | Tan | G05F 1/67 363/131 |
| 9,450,513 | B2* | 9/2016 | Ohori | H02M 7/44 |
| 9,641,021 | B2* | 5/2017 | Gong | H02J 3/383 |
| 9,673,733 | B2* | 6/2017 | Matsuoka | H02M 7/537 |
| 9,847,647 | B2* | 12/2017 | Premerlani | H02J 3/18 |
| 2012/0326649 | A1* | 12/2012 | Patanaik | H02J 1/14 318/453 |
| 2015/0162750 | A1 | 6/2015 | Varma | |

OTHER PUBLICATIONS

International Search Report and Written Opinion dated Mar. 12, 2020 which was issued in connection with PCT No. PCT/US2019/068467 which was filed Dec. 24, 2019.

Jietan Zhang et. al.: Dynamic frequency support by photovoltaic generation with "synthetic" inertia and frequency droop control: 2017 IEEE Conference on Energy Internet and Energy System Integration, IEEE Nov. 26, 2017.

Hua Tianqi et. al.: "Research on power point tracking algorithm considered spinning reserve capacity in gird-connected photovoltaic system based on VSG control strategy" 2017 IEEE 3rd International Future energy Electronics Conference and ECCE Asia, IEEE Jun. 3, 2017.

Bose Upama et. al.: "A novel method of frequency regulation in microgrid" 2016 IEEE 7th Power India International Conference, IEEE Nov. 2016.

Marco Liserre et. al.: "Overview of multi-MW Wind Turbines and Wind Parks" IEEE Transactions on Industrial Electronics, IEEE Service Center Apr. 1, 2011.

* cited by examiner

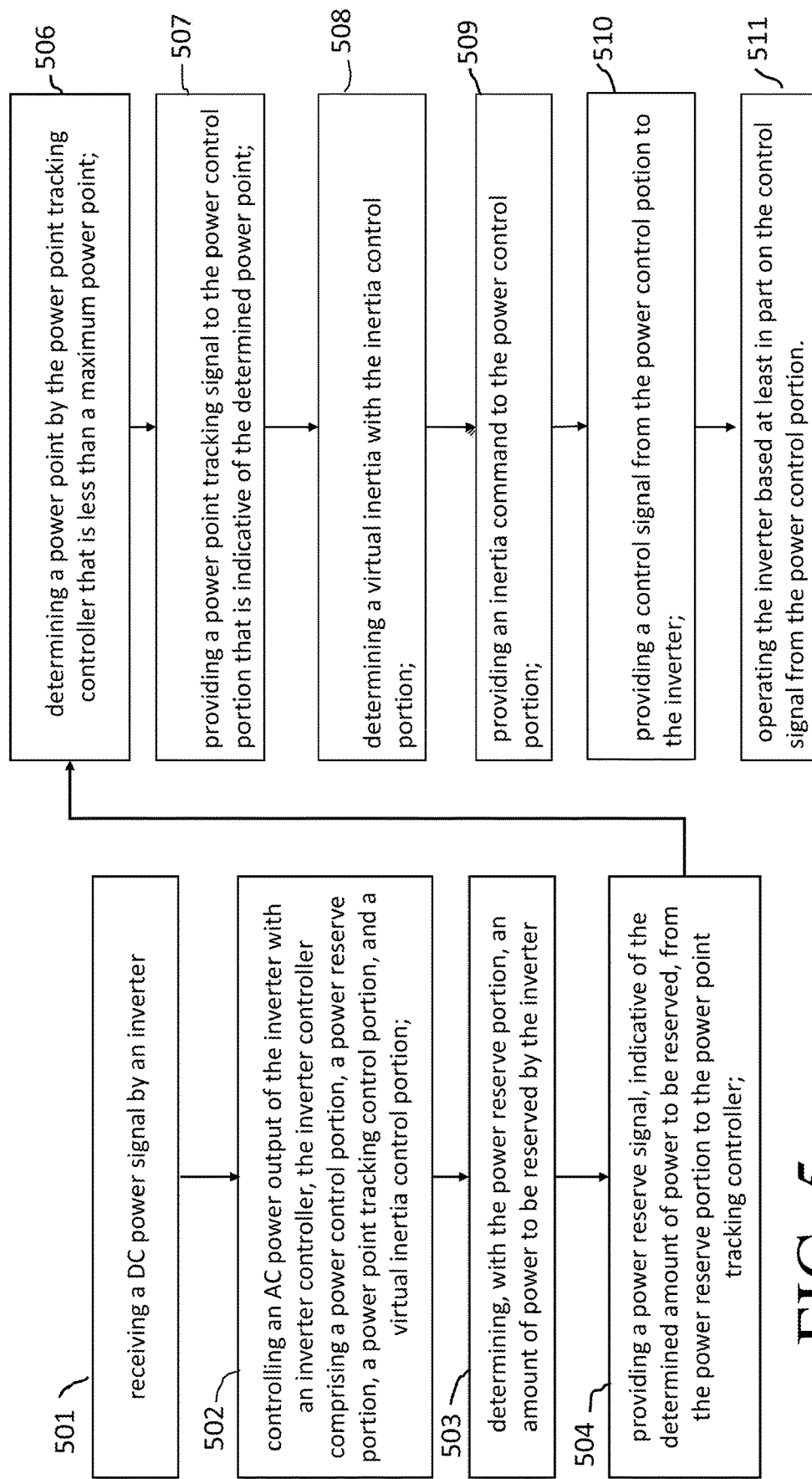

VIRTUAL SYNCHRONOUS GENERATOR SYSTEM AND METHOD WITH VIRTUAL INERTIA CONTROL

This invention was made with government support under DE-AC05-00OR22725 awarded by the United States Department of Energy. The government has certain rights in the invention.

BACKGROUND

Technical Field

Embodiments of the invention relate generally to power generators and more specifically to power generators employing a virtual synchronous generator.

DISCUSSION OF ART

The use of grid-connected photovoltaic (PV) power generation systems has increased in recent years. One problem with the increasing utilization of PV power generation, is that the reserve capacity, or rotational inertia, provided by conventional power systems may be consequently decreased, and the risk of system instability increased.

Conventional generators (such as fossil fuel generators) increase the temperature and pressure of a gas to drive turbines. The rotating turbines are coupled to alternators by a shaft or rotor to generate AC electricity therewith, wherein the rotational speed of the alternator is directly proportional, (i.e., synchronous) relative to the grid frequency.

Such conventional synchronous generators operate with high inertia, due to the mass of the spinning turbine, and thus any disturbance to the grid must work against the inertia. This inertia associated with synchronous generators is desirable, for example because it provides time, in the event of a disturbance, for a grid operator to take actions such as shedding loads or switching to backup systems. Additionally, the inertia associated with synchronous generators increases the transient stability of the system (i.e., the ability of the power system to maintain synchronism when subjected to a disturbance such as a fault on transmission facilities, loss of generation, or loss of a large load).

In contrast to synchronous generators, PV solar generators are asynchronous relative to grid frequency. In further contrast, PV generators are typically connected to the power grid through voltage-source converters or inverters that convert a DC voltage of the PV modules into an AC voltage. Since typical inverter-based photovoltaic (PV) power stations do not have rotating elements, and usually operate under conventional maximum power point tracking (MPPT) control strategies (such as conventional incremental-conductance type MPPT), they are not able to provide adequate kinetic or potential energy to stabilize the power grid. As a result, in the event of load changes or other disruptions, the frequency change in a conventional PV-based power system will be faster and result in a less stable grid than synchronous generator-based power systems.

To enable use of PV and other DC-side power supplies in grid-connected power systems without reduction of system inertia, virtual synchronous generator (VSG) technology may be employed. Some known conventional VSGs allow grid-connected inverters to simulate the inertia of synchronous generators by using current/voltage feedback from the inverter output and generating appropriate gating signals and frequency controls to thereby define a "virtual inertia" of the system. For example, some known VSGs define a virtual inertia through the application of frequency controls.

Such frequency control is typically implemented by modifying the inertial response of the system (i.e., by adding a virtual inertia), for example, by controlling the power electronics interface of a distributed generator or an inverter to minimize variations in the fundamental frequency as well as in the power flow through the energy storage system.

The frequency variation in a power system after a frequency event or disturbance can be approximated by the equation:

$$P_{gen} - P_{load} = \frac{d(E_{K,E})}{dt} = \frac{d\left(\frac{1}{2}J\omega_g^2\right)}{dt} \tag{1}$$

$$P_{gen} - P_{load} = J\omega_g \frac{d\omega_g}{dt} \tag{2}$$

where, Pgen is the generated power, Pload is the power demand including losses, J is the total system inertia, and wg is the system frequency. The inertia constant of the power system H is the kinetic energy normalized to apparent power Sg of the connected generators in the system:

$$H = \frac{J\omega_g^2}{2S_g} \tag{3}$$

Equation (2) can then be written as:

$$\frac{2H}{\omega_g}\frac{d\omega_g}{dt} = \frac{P_{gen} - P_{load}}{S_g} \tag{4}$$

Equation (4) can also be represented in terms of frequency (Hz) instead of angular frequency (rad/s) as follows:

$$\frac{2H}{f}\frac{df}{dt} = \frac{P_{gen} - P_{load}}{S_g} \tag{5}$$

where df/dt is the rate of change of frequency (ROCOF) of the system. With the reduced inertia of conventional grid-connected PV systems, the ROCOF of the system increases, which causes larger changes in frequency of the system in the same time-frame.

Additionally, conventional PV systems employ MPPT to improve the efficiency of power transfer from the solar cells which depends on both the amount of sunlight falling on the solar panels and the electrical characteristics of the load. As the amount of sunlight varies, the load characteristic that gives the highest power transfer efficiency changes, so that the efficiency of the system is optimized when the load characteristic changes to keep the power transfer at highest efficiency. This load characteristic is called the maximum power point (MPP) and MPPT controls determine this maximum power point and keep the load characteristic at the MPP to provide the maximum power output. Conventional MPPT controls operate (for example, using a microcontroller) by sampling the output power (I-V curve) from the solar modules and applying a calculated resistance (i.e., load) to obtain the maximum power at any given environmental condition. MPPT devices are typically integrated into an electric power converter system that provides voltage or current conversion, filtering, and regulation for driving various loads, including power grids, batteries, or motors. The power at the MPP (Pmpp) is the product of the MPP voltage (Vmpp) and MPP current (Impp).

For example, a typical MPPT controller may employ an incremental conductance method, wherein the MPPT controller measures incremental changes in PV array current and voltage to predict the effect of a voltage change. This uses the incremental conductance (dI/dV) of the photovoltaic array to compute the sign of the change in power with respect to voltage (dP/dV). The MPP is determined by comparison of the incremental conductance (IΔ/VΔ) to the array conductance (I/V). When these two are the same (I/V=IΔ/VΔ), the output voltage is the MPP voltage. The incremental conductance method is based on the observation that at the maximum power point dP/dV=0, and that P=IV. The current from the PV array can be expressed as a function of the voltage: P=I(V)V. Therefore, dP/dV=VdI/dV+I(V). Setting this equal to zero yields: dI/dV=−I(V)/V. Therefore, the maximum power point is achieved when the incremental conductance is equal to the negative of the instantaneous conductance.

If the PV power supply operates at a sub-optimal output (i.e. not maximum power tracking), the conventional VSG control methods can contribute to the system frequency regulation (for example, primary frequency regulation). For example, this may be done by applying a power limit and/or a frequency droop (which may have a frequency dead-band for frequency regulation). However, the power limit is not an optimal since the maximum power is not typically known until a maximum power point tracking (MPPT) is performed. Additionally, the frequency-based droop is based on a frequency measurement (e.g., locally or from a higher-level controller) which may have filtering in the measurement and thus may cause some delay in response to the frequency event, in addition to the dead-band may cause non-responsiveness from the PV inverter. These factors cause the PV inverter to not effectively contribute to the system inertia when it is most needed. Therefore, it is difficult to directly connect the PV power supply to traditional VSGs for providing power to the grid into the grid.

Conventional solar inverter controllers convert the DC power to AC power and typically apply MPPT algorithms to determine the maximum power output available from the PV panel. It is well known that the amount of sunlight available to the PV panel varies over time, and the load characteristic that enables the highest power transfer efficiency likewise changes. In such cases, the efficiency of the system is optimized when the load characteristic changes to keep the power transfer at highest efficiency. The power delivered from the PV panel is optimized where the derivative (i.e., the slope) dI/dV of the I-V curve is equal and opposite the IN ratio (where dP/dV=0). This is known as the maximum power point (MPP) and corresponds to the "knee" of the curve. MPPT devices and systems are configured to determine the MPP and retain the load characteristic at the MPP. For example, many conventional MPPT systems sample the electrical output (e.g., the I-V curve) of the PV panel electrical output and apply a corresponding resistance (load) to obtain the maximum power for a given environmental condition. The power at the MPP (Pmpp) is the product of the MPP voltage (Vmpp) and MPP current (Impp). MPPT devices are typically integrated into electric power converters that additionally provide voltage or current conversion, filtering, and regulation for driving various loads.

As discussed above, this approach results in zero available inertia for a PV system, for example in the event of a contingency such as an under-frequency event. Therefore, it is desirable for a PV system to reserve a predetermined amount of reserve power to be provided in the event of an undesired drop in the grid frequency. However, because the maximum power available at a given point in time in a PV system is not known with certainty beforehand, it has been challenging to reserve a specific amount of power based on a certain percentage of maximum power. For example, relying on a conservative fixed power limit to run the PV inverter may result in large power losses and therefore is not economically feasible. Alternatively, relying on forecasts or predicted maximum power levels requires costly hardware and more complicated software to implement.

It is well known that at the maximum power point, the following equation holds true:

$$V_{pv} * \Delta I_{pv} + I_{pv} \Delta V_{pv} = 0 \tag{6}$$

Additionally, when a per-unitized dynamic conductance (PDC) is defined as:

$$\frac{\Delta I_{pv}}{\Delta V_{pv}} * V_{pv} / I_{pv}, \tag{7}$$

then, at the maximum power point (MPP), the PDC is equal to −1. Accordingly, while there is a large variety of PV panel manufacturers and of PV cell technologies (e.g., mono-si, poly-si, CdTe), the PDCs of most panels are similar across a large power range. Additionally, at a given power range, for example, 50%400% of maximum power, the PDC and PV power of most panels have an approximately linear relationship.

It would be desirable therefore to have an improved system and method to enable an inverter to more effectively control the virtual inertia of an asynchronous power system.

BRIEF DESCRIPTION

In an embodiment, a method for operating a power system is disclosed. The method includes receiving a DC power signal by an inverter and controlling a power output of the inverter with an inverter controller, wherein the inverter controller comprises a power control portion, a power reserve portion, a power point tracking control portion, and a virtual inertia control portion. The method further includes the steps of determining, with the power reserve portion, an amount of power to be reserved by the power point tracking control portion, providing a power reserve signal, indicative of the determined amount of power to be reserved, from the power reserve portion to the power point tracking controller, determining a power point that is less than a maximum power point by the power point tracking controller, providing a power point tracking signal to the power control portion that is indicative of the determined power point, determining with the inertia control portion a virtual inertia; providing an inertia command signal indicative of the determined virtual inertia to the power control portion, and providing a power control signal from the power control portion to the inverter. The control signal is based at least in part on the power point tracking signal and the inertia command signal. The method also includes operating the inverter based at least in part on the power control signal.

DRAWINGS

The present invention will be better understood from reading the following description of non-limiting embodiments, with reference to the attached drawings, wherein below:

FIG. 5 is a flow diagram of a method according to an embodiment.

DETAILED DESCRIPTION

Figure 1A:
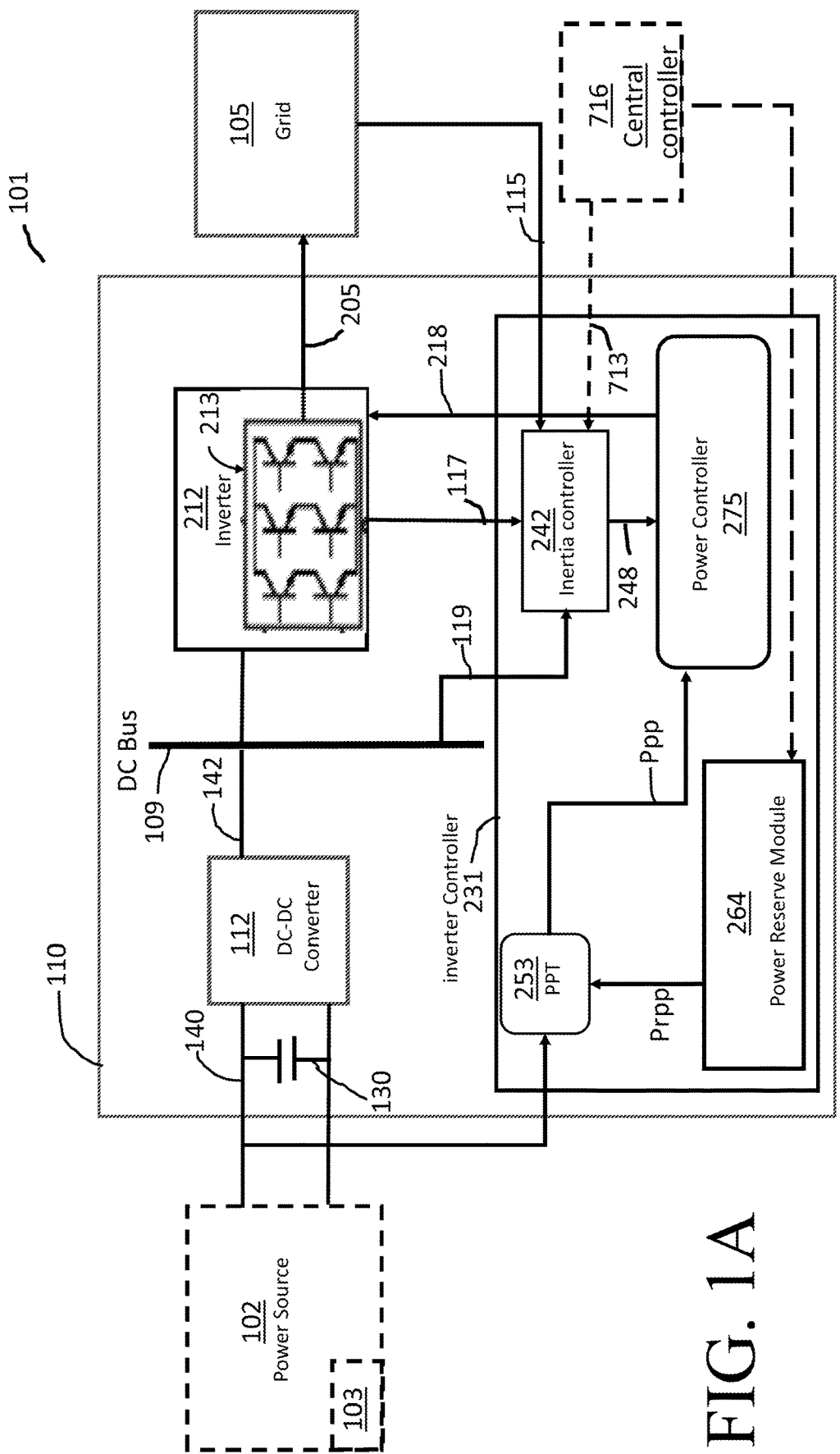
FIG. 1A is a schematic diagram of a power system employing a VSG according to an embodiment.

Reference will be made below in detail to exemplary embodiments, examples of which are illustrated in the accompanying drawings. Wherever possible, the same reference characters used throughout the drawings refer to the same or like parts, without duplicative description.

While the embodiments disclosed herein are primarily described with respect to PV power generation systems and methods, it is to be understood that embodiments of the present invention may be applicable to other apparatus, systems, and/or methods that benefits from the teachings herein.

Embodiments as describe herein include a power generation system, such as a PV panel, coupled to a DC bus in signal communication with an inverter and an inverter control system employing an inverter control method, for connection to a load such as a grid.

Referring now to FIG. 1. a schematic diagram of an exemplary power generation system 101 is shown. In one embodiment, power generation system 101 comprises a power source 102 that provides a DC voltage output 140. In certain embodiments, a DC-to-DC converter 112 may be coupled to the power source 102 to receive and control the DC voltage 140. In other embodiments, power source 102 may provide alternating current (not shown) which is then converted to direct current by an AC to DC converter (not shown).

The power source 102 may comprise a renewable power source such as a photovoltaic (PV) generator or a wind turbine generator, for example. In embodiments, the power source 102 may comprise at least one PV panel 103. As depicted in the illustrated embodiment, power generation system 101 may also comprise a DC link 130 with a temporary energy storage device, such as a capacitor, arranged to receive the DC voltage 140.

The power generation system 101 is configured for connection to an electrical load or power grid 105 and comprises a virtual synchronous generator (VSG) 110 including an inertia controller 242 according to an embodiment. The power source 102 is operated substantially at a power limit that is less than the maximum power point (MPP), that is, where the output values of the current and voltage of the power source 102 result in a power output that is less than the MPP.

The power source 102 is electrically coupled to the VSG 110. As described herein, the VSG 110 is configured to convert the direct current (DC) voltage 140 into an alternating current (AC) output signal 205 which is fed to the electric grid 105. The VSG 110 comprises a power converter such as an inverter 212. The DC voltage 140 may be provided to a DC bus 109. The DC bus 109 is coupled via a conductive line to an inverter 212 to provide the DC voltage 140 thereto. In other embodiments, the DC voltage 140 is provided directly to the inverter 212. The inverter 212 is configured to convert the DC voltage 140 to an AC voltage and to provide an output signal 205 to the grid 105.

Figure 1B:
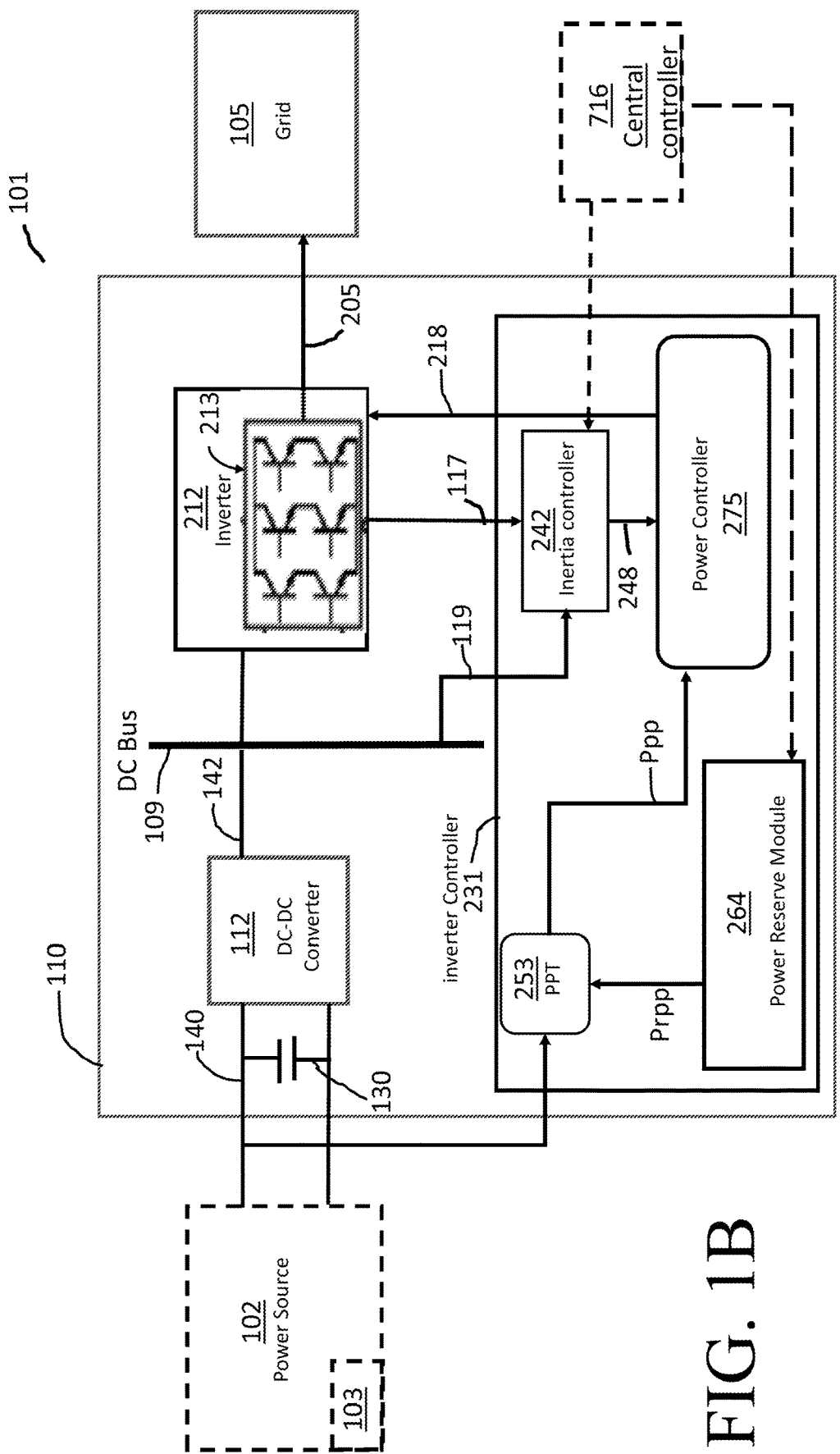
FIG. 1B is a schematic diagram of a power system employing a VSG according to an alternative embodiment.
Figure 1C:
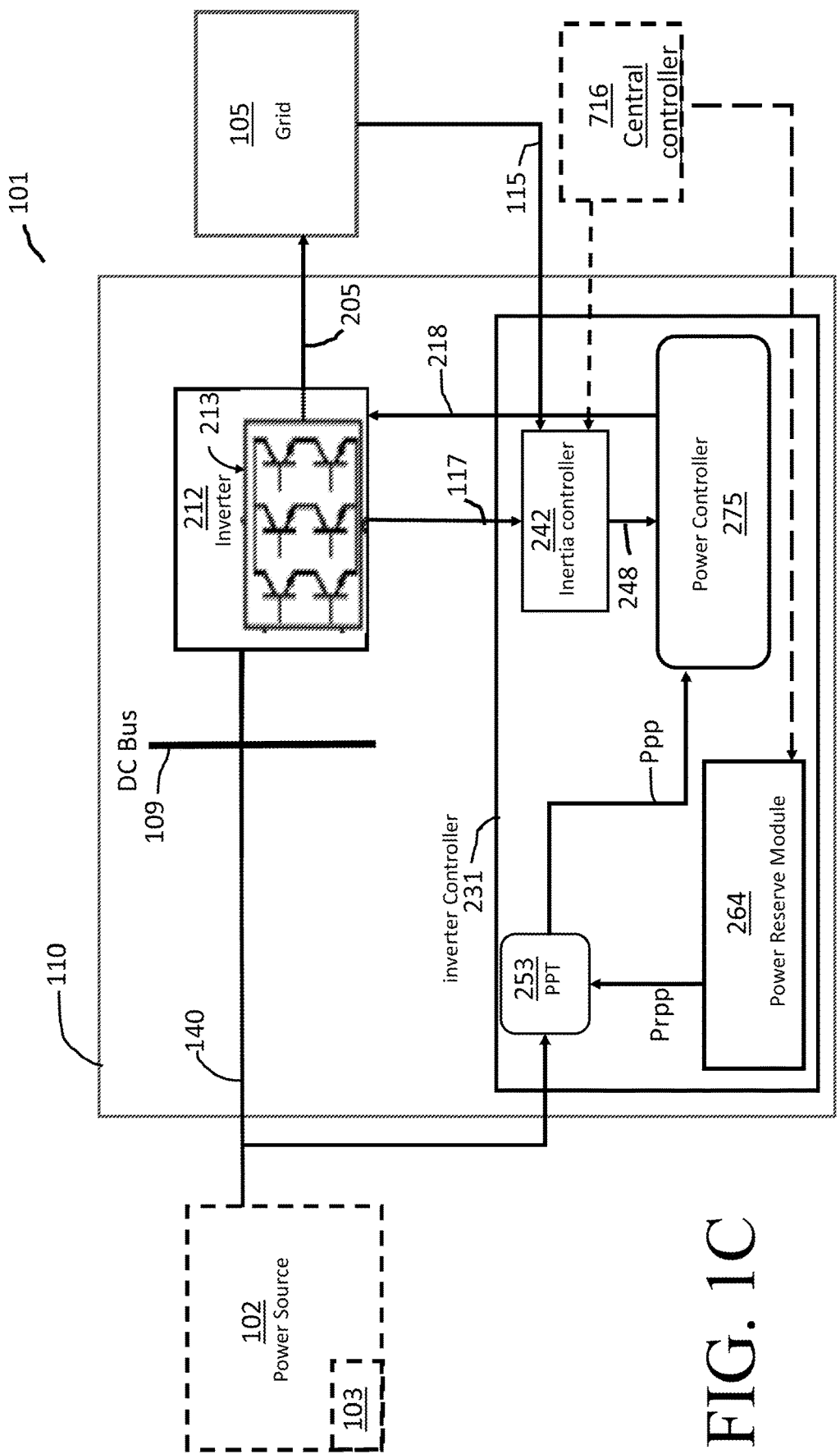
FIG. 1C is a schematic diagram of a power system employing a VSG according to another alternative embodiment.

As shown in the illustrated embodiments of FIGS. 1A-1C, the VSG 110 may include a DC-DC converter 112. The power source 102 is electrically coupled to the VSG 110 to provide the DC power output of power source 102 to the DC-DC converter 112. For example, in embodiments, the power source 102 output is at a first DC voltage 140 which is provided to the DC-DC converter 112, for conversion to a second DC voltage 142 by the DC-DC converter 112. Other embodiments, as depicted in FIG. 1C, may omit the DC-DC converter 112.

For example, in an embodiment, a high-frequency DC-to-DC converter 112 may be arranged to convert the first DC voltage 140 output from the PV module 103 to a high-frequency AC voltage, and then rectify the high frequency AC voltage back down to the second DC voltage 142. The second DC voltage 142 is provided via a conductive line to a DC bus 109. The DC bus 109 may be electrically coupled to an inverter 212 to provide the second DC voltage 142 thereto. It will be understood that additional PV panels 103, and/or power storage devices (not shown) may likewise be coupled in parallel to respective DC-DC converters (not shown), each having a respective second DC voltage output 142 coupled to the DC Bus 109, without departing from the scope of the invention.

In various embodiments, the inverter 212 may be a single-stage inverter 212. In other embodiments, the inverter 212 may be a multi-stage inverter 212, such as a two-stage inverter 212. For example, in one embodiment, the inverter 212 has a three-phase two-level topology comprising a series of semi-conductor power switches 213 fully controlled and regulated, for example, using a conventional pulse width modulation (PWM) method. The semiconductor power switches 213 may comprise any appropriate devices such as Insulated Gate Bipolar Transistors (IGBTs), Gate Communicated Thyristors (GCTs), and Metal Oxide Semiconductor Field Effect Transistors MOSFETs). In other embodiments, power converter 212 comprises other multi-level converters such as five-level converters.

The VSG 110 includes an inverter control portion 231 in signal communication with the inverter 212 to control the inverter 212 AC output signal 205. In the illustrated embodiment of FIGS. 1A-1C, inverter 212 functions as a voltage source for electrical system 101 wherein the inverter controller 231 controls the frequency and amplitude of the output signal 205 of inverter 212. The inverter controller 231 provides a control signal 218 to control the turn-on or turn-off actions of the inverter 212 semiconductor switches 213 to generate a regulated AC voltage output signal 205 to be provided to the grid 105.

According to an embodiment, the inverter controller 231 comprises a regulator or power control portion 275, a power reserve portion 264, a power point tracking (PPT) control portion 253, and a virtual inertia control portion 242, which cooperatively generate the control signal 218 to control the inverter 212. In some embodiments, the inverter controller 231 may also be further responsive to an external controller 716 (such as a centralized or plant-level controller 716) to generate the control signal 218 to control inverter 212. The inverter control portion 231 may include conventional active power and reactive power control circuits (not shown). In embodiments, the active power control circuit may include the virtual inertia control portion 242.

The inverter 212 operation is controlled based at least in part on the input control signal 218 received from the inverter control portion 231. The inverter control portion 231 may provide the control signal 218 in the form of a PWM control signal to control the operation of the inverter 212 to transform the received DC voltage 140, 142 into the AC voltage output 205. For example, in the embodiment depicted in FIGS. 1A-1C, the power control portion 275 may comprise a modulator portion 214 that includes a high switching frequency SPWM (Sinusoidal Pulse Width Modulation) stage (not shown) configured to produce a low-frequency sine-wave output as the input control signal 218 to the inverter 212. In some embodiments, inverter controller 231 comprises an onboard microcontroller (not shown) arranged to rapidly toggle switches 213 such as power MOSFETs in inverter 212 between an ON and an OFF condition at a high frequency (e.g., 50 kHz). The power MOSFETs may use a low voltage DC source (such as the PV panel, a battery, or the DC bus 109) to provide a DC signal to one or more step-up transformers (not shown) to produce a higher voltage signal. The output of the step-up transformers (not shown) may be filtered (e.g., using capacitors). This higher voltage DC signal may then be further pulsed with additional power MOSFETs (not shown) by the microcontroller to produce a modified sine wave signal. In other embodiments, for example, the DC input stage of inverter 212 may be modulated to a rectified sine-wave output, followed by a low-frequency switched stage to provide a desired sine-wave output 205.

In some embodiments, the inverter control portion 231 is arranged integral with the inverter 212. In other embodiments, the inverter control portion 231 is disposed remote from the inverter 212.

The control signal 218 received by the inverter 212 from inverter control portion 231 may be based on at least on one or more factors, such as a calculated or determined amount of reserve power, a calculated or determined virtual inertia, a power point tracking value, and a status of the grid.

Figure 4:
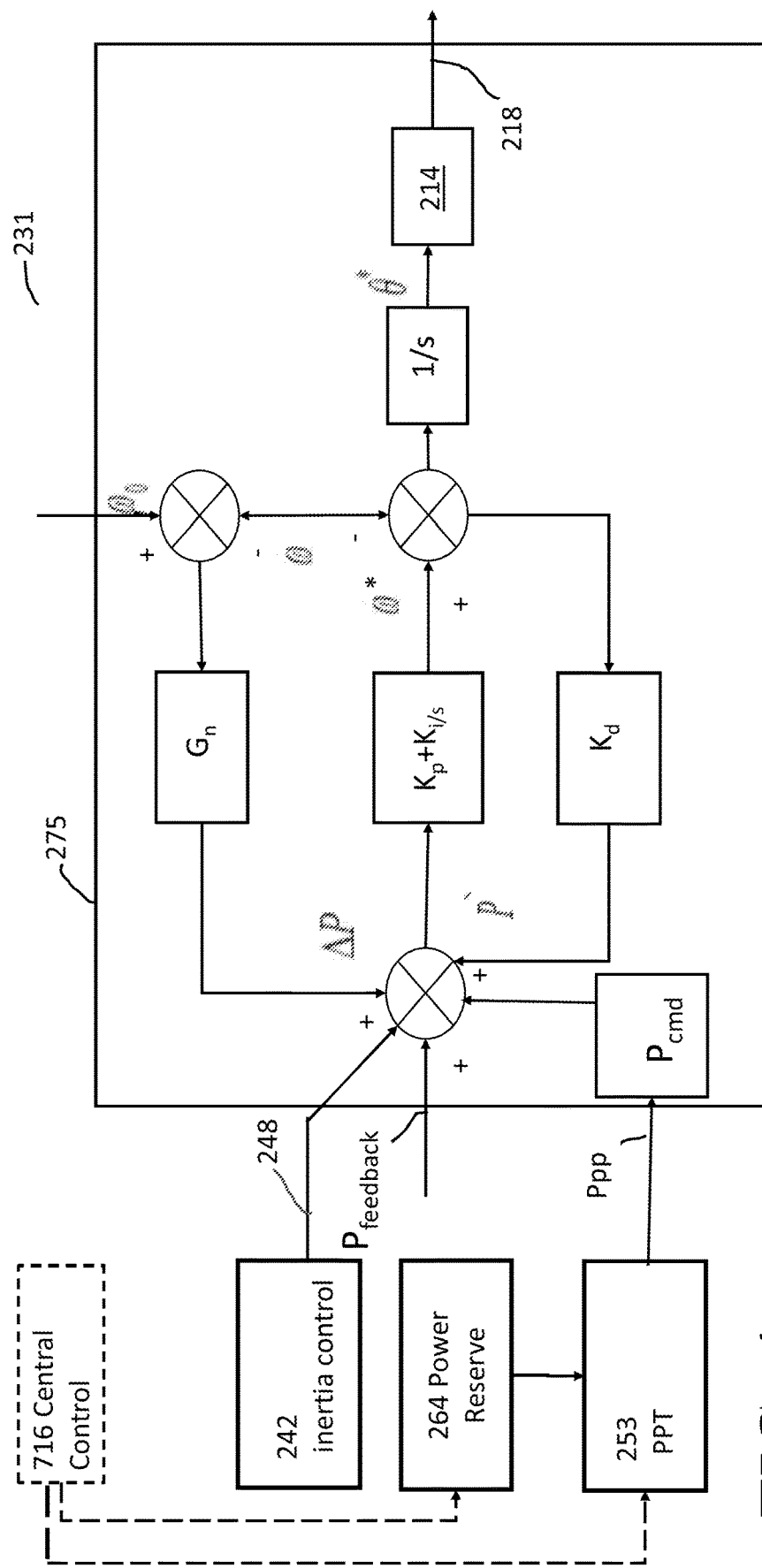
FIG. 4 is a schematic diagram of an inverter controller according to an embodiment.

Referring to FIG. 4, the inverter control portion 231 according to one embodiment comprises power control portion 275, which may include conventional elements such as an integrator (not shown), a detector (not shown) a voltage regulator (not shown), an integrator (not shown), a modulator 214, and various summation elements which are collectively configured to generate PWM control signals 218 for inverter 212. However, in contrast to conventional inverter control methods, and as discussed in more detail herein, the output signal 218 of the power control portion 275 is additionally based at least in part on an inertia command signal 248 received from the inertia control portion 242, and a power point tracking output signal Ppp that is less than a maximum power point (MPP) of the power source.

In embodiments, the virtual inertia control portion 242 is arranged in signal communication with the power control portion 275. The virtual inertia control portion 242 calculates or determines an amount of virtual inertia 248. In an embodiment, the virtual inertia control portion 242 calculates or determines the virtual inertia 248 based at least in part on a predetermined or desired virtual inertia to be available during a grid 105 contingency event, and a signal input to the inertia control portion 242. In embodiments, the signal input to the inertia control portion 242 may comprise one or more reference signals, such as a first reference signal 119 received from the DC bus 109, a second reference signal 115 received from grid 105 indicative of a status (e.g., a voltage, current, frequency, power, load, or other status) of the grid 105, and a third reference signal received from the inverter 212. The virtual inertia control portion 242 provides an inertia command signal 248a to the power control portion 275 that is indicative of the determined or calculated virtual inertia 248.

For example, as illustrated in FIG. 1B, the virtual inertia control portion 242 may determine an amount of virtual inertia 248 based in part on a first input signal provided to the inertia control portion 242, such as a DC reference signal 119 indicative of the voltage on DC bus 109. In other embodiments, as depicted in FIG. 1C, the virtual inertia control portion 242 may determine the amount of virtual inertia 248 based in part on a second reference input signal 115 indicative of a predetermined external variable, (e.g., the rate of change of the frequency (ROCOF) or other measured variable indicative of a status of the grid 105) provided to the inertia control 242. In still other embodiments, as illustrated in FIGS. 1A-1C, the virtual inertia control portion 242 may determine the amount of virtual inertia 248 based in part on a third input reference signal 117 indicative of the grid frequency, (e.g. received from the inverter 212). In yet other embodiments, as depicted in FIG. 1A, the virtual inertia control portion 242 may determine the amount of virtual inertia 248 based at least in part on a combination of the first, second and third input reference signals 119, 115, 117 provided to the inertia control portion 242.

In embodiments, the inertia control portion 242 may determine the virtual inertia 248 using a conventional processing block (not shown), such as for example, a simple gain or a regulator processing block. In some embodiments, the processing block may include a direction control or limit to the input and output, respectively.

The predetermined or calculated amount of virtual inertia 248 may be defined relative to a full load output of the VSG 110. In embodiments, inertia control portion 242 provides the inertia command signal 248a to the power control portion 275 that is indicative of the determined virtual inertia 248 (for example, 20% of the full potential output of the PV panel 103, subject to the rating of the VSG 110). In various embodiments, this inertia signal 248a is indicative of a predetermined fixed amount of virtual inertia 248. The fixed amount of virtual inertia 248 may be stored in a look up table or calculated using predetermined algorithms. In some embodiments, the determined amount of virtual inertia 248 may be based at least in part upon a control signal 713 provided to the virtual inertia control portion 242 by an external or centralized controller 716, such as a plant controller, remote from the VSG.

In other embodiments, the inertia command signal 248a indicative of the determined amount of virtual inertia 248, is indicative of a dynamically variable amount of virtual inertia 248. For example, in such embodiments, the virtual inertia command signal 248a to the power control portion 275 from the virtual inertia control portion 242 is indicative of an amount of virtual inertia 248 that is variable with respect to the full load output of the VSG 110. In certain embodiments, the variable amount of virtual inertia 248 is based at least in part on the control signal 713, that may be indicative of a predetermined system inertia estimate function determined by the external controller 716 and provided to the virtual inertia control portion 242 therefrom.

In the illustrated embodiments of FIGS. 1A-1C, the VSG 110 includes a power point tracking (PPT) control portion 253. In contrast to conventional power systems, which are typically configured to ensure that the power sources work substantially at a maximum power point, embodiments as described herein are configured to operate without determining the MPPT and are configured to operate at a power point that is less than a conventionally determined MPP.

Specifically, the PPT control portion 253 of VSG 110 is arranged to operate similarly to a conventional MPPT control (for example, using a conventional incremental conductance calculation) but is instead configured to provide a PPT signal (Ppp) output that is indicative of an predetermined or calculated amount of power that is less than a maximum available power (MPP) of the panel 103, in order to thereby provide an increased virtual inertia for the PV system. The PPT control portion 253 is coupled in signal communication with the power control portion 275 and provides the power point tracking output signal Ppp thereto.

Figure 2:
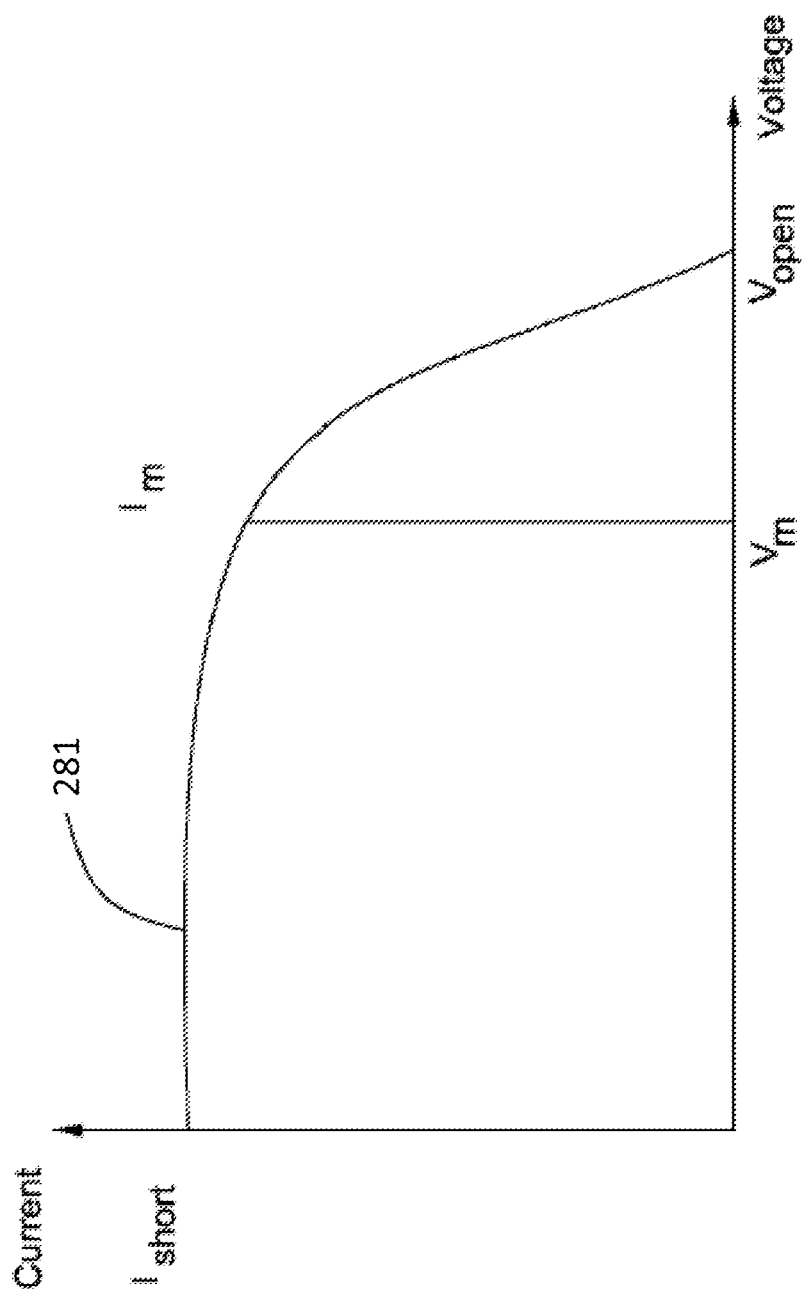
FIG. 2 illustrates a voltage-current curve for a solar power source.
Figure 3:
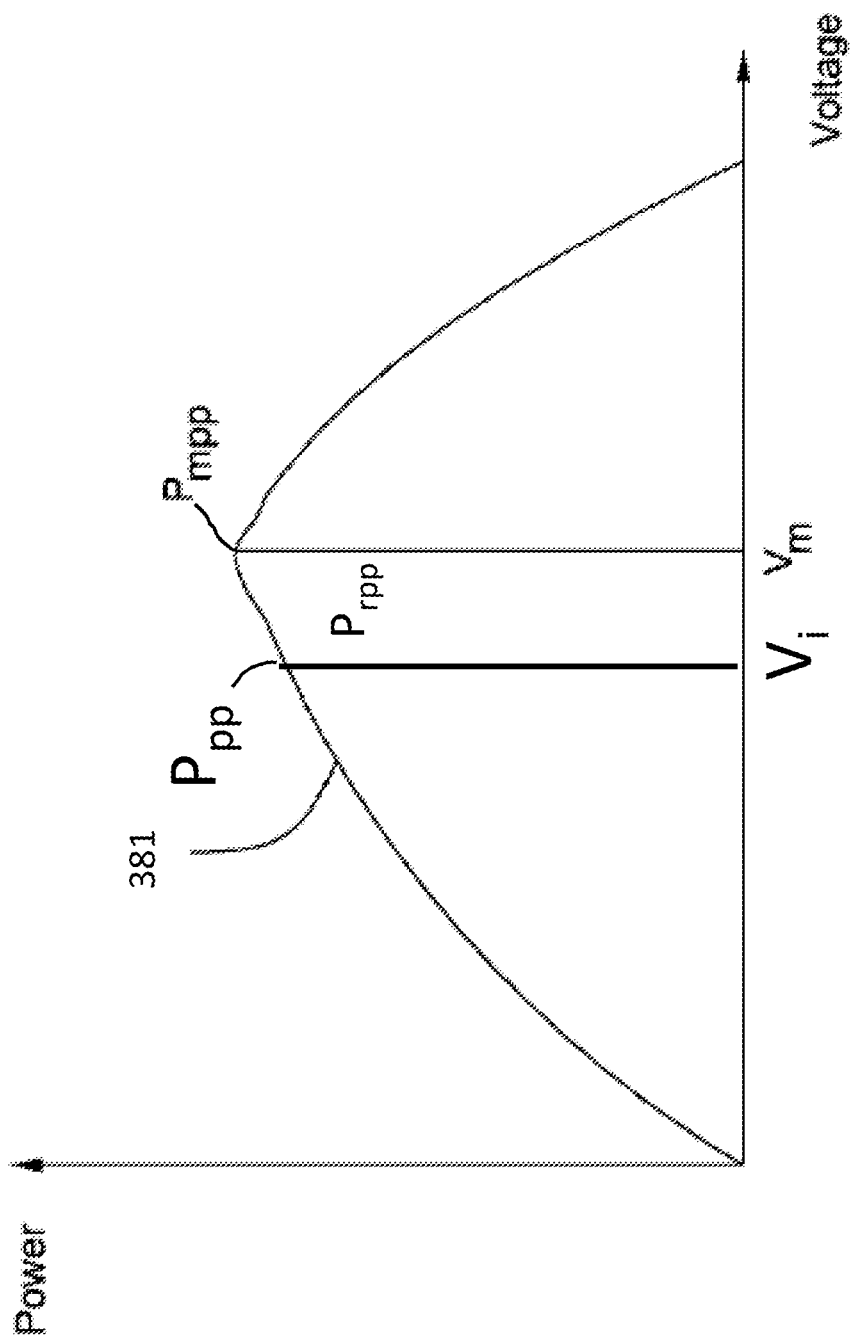
FIG. 3 illustrates a voltage-power curve for a solar power source.

Referring to FIGS. 2 and 3, a current-voltage curve (V-I curve) 281 of FIG. 2 illustrates the voltage-current characteristic of power source 102 under certain operating conditions, and a power-voltage curve (P-V curve) of FIG. 3 illustrates the corresponding power characteristic of power source 102 under the same conditions. The voltage at the V-I curve is almost zero at a short-circuit current ($O_{short}$) when the output terminals of the PV panels 103 are shorted together. As the output voltage increases, the current value of V-I curve 281 remains at a substantially constant level until it reaches a knee point (Im, Vm) at which it descends rapidly toward zero current at an open circuit voltage output (V open).

Referring to FIG. 3, in certain embodiments, P-V curve 381 is the current times the voltage at each point along V-I curve 281. P-V curve 381 has a maximum power ($P_{mpp}$) corresponding to the knee point of the V-I curve in FIG. 2, which is known as the MPP.

In accordance with certain embodiments, the power reserve portion 264 is in signal communication with the PPT control portion 253. A power reserve signal (Prpp) is output from the power reserve portion 264 and provided as an input to the PPT control portion 253. The PPT portion determines a power tracking point that is less than a maximum available power (MPP) of the panel 103 and provides a PPT signal (Ppp) output that is indicative of the determined power point to the power control portion 275. By incorporating the input signal (Prpp) from the power reserve module 264, the PPT control 253 can enable either maximum or partial power extraction at a predetermined percentage of maximum power in a predefined linear range such as 70%-100%.

In an embodiment, the power reserve module 264 calculates or determines an amount of reserve power (Prpp) relative to the maximum power potential (Pmpp) of the DC source 102. In some embodiments, the maximum power potential may be the maximum power output of the PV power source, or the maximum power point as would be determined using conventional MPPT methods. The calculated reserve power amount (Prpp) is used by the power point tracking control 253 to determine an optimal tracking point that is less than the conventional maximum power point (Pmpp).

For example, the power reserve module 264 determines the amount of available power (Prpp) to be withheld (i.e., held in reserve), from the grid 105 under normal operating conditions, in anticipation of providing the reserved power to the grid 105 under a contingency condition. The determined amount of reserve power (Prpp) may be based at least in part on predetermined values stored in a look-up table, and/or by executing an algorithm.

In embodiments, the amount of reserved power (Prpp) is determined by the power reserve module 264 based on a predetermined relationship or mapping between an amount of reserve power and a standardized or normalized dynamic conductance. In this way, the amount of reserved power (Prpp) is determined without a need to calculate the MPP. For example, in embodiments, the amount of reserved power (Prpp) may be determined based on a predetermined value or amount of reserve power, and a corresponding standardized dynamic conductance that is calculated (e.g, by a look-up-table method).

In embodiments, the power control portion 275 of inverter control portion 231 may comprise both the inertia control portion 242 and the power reserve module 264. Moreover, in addition to receiving the reserve power signal Prpp and power point tracking output signal Ppp, in various embodiments, the power controller 275 may additionally receive a command signal (Pcmd). For example, the power command signal (Pcmd) may be a scheduled power command from a centralized controller 716 or other supervisor controller, such as a command signal from an external or remote distribution system operator (DSO) or a transmission system operator (TSO). In other embodiments, the Pcmd signal may be adjusted based on a level of the power point tracking output signal Ppp.

In embodiments, the power controller 275 may further receive a power feedback signal (Pfeedback). In one embodiment, inverter control portion 231 has a closed loop power control and uses a measured power signal from AC power as the power feedback signal (Pfeedback). The inertia command signal 248 from the virtual inertia control portion 242 may also be added to the power feedback signal ($P_{feedback}$).

In other embodiments, the power feedback signal ($P_{feedback}$) may comprise a blended signal. For example, the power feedback signal ($P_{feedback}$) may comprise both the measured power signal 119 from the DC bus 109 and the reference signal 115 from the grid 105. In another embodiment, the blended power feedback signal ($P_{feedback}$) may comprise an average value of the measured power signals from DC bus 109 and the grid signal 115. The power controller 275 may use the signal ($P_{feedback}$) to generate an internal frequency signal (w). In certain embodiments, the internal frequency signal (w) is different from a frequency of electrical grid 105. A phase angle signal (not shown) may be generated by integrating the internal frequency signal (w) using an integrator (not shown).

The power control portion 275 may also use any number of known techniques to generate an internal frequency signal (w). For example, as depicted in FIG. 5, the power control portion 275 may comprise a typical proportional-integral (PI) controller 271 and may include a droop loop (not shown) to generate the internal frequency signal (w). The droop loop may comprise a comparator (not shown) to compare the internal frequency signal (w) with a frequency base signal ($W_{ref}$) and uses a difference thereof to limit a power imbalance.

In some embodiments, the power control portion 275 may provide an output signal (not shown) to a voltage regulator portion (not shown) of the inverter control 231. In other embodiments, the output signal of the power control portion 275 may be provided to the modulator 214 of inverter control portion 231 to thereby provide the input control signal 218 to the inverter 212.

With reference to FIG. 5, the VSG 110 as described herein may be employed to execute method steps in an embodiment. For example, a PV power system 101 may be operated using the VSG 110. At step 501, the DC power signal 142 is received by an inverter 212. At step 502, a power output of the inverter 212 is controlled with an inverter controller 231, wherein the inverter controller 231 comprises a power control portion 275, a power reserve portion 264, a power point tracking control portion 253, and a virtual inertia control portion 242. At step 503, an amount of power to be reserved by the power point tracking control portion 253 is determined with the power reserve portion 264. At step 504, a power reserve signal Prpp, indicative of the determined amount of power to be reserved, is provided from the power reserve portion 264 to the power point tracking controller 253. At step 506, a power point Ppp is determined by the power point tracking controller that is less than a maximum power point MPP. At step 507, a power point tracking signal Ppp is provided to the power control portion 275 that is indicative of the power point. At step 508, the virtual inertia control portion 242 determines a virtual inertia, and at step 509, provides an inertia command signal 248 indicative of the determined virtual inertia to the power control portion 275. At step 510, a power control signal 218 is provided from the power control portion 275 to the inverter 212, wherein the control signal is based at least in part on the power point tracking signal Ppp and the inertia command signal 248. At step 511, the inverter 212 is operated based at least in part on the power control signal 218. The output of the inverter 212 is provided to the grid 105.

While the dimensions and types of materials described herein are intended to define the parameters of various embodiments, they are by no means limiting and are merely exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "above," "below," etc. are used merely as labels, and are not intended to impose numerical or positional requirements on their objects. Further, the limitations of the following claims are not written in means-plus-function format and are not intended to be interpreted as such, unless and until such claim limitations expressly use the phrase "means for" followed by a statement of function void of further structure.

This written description uses examples to disclose several embodiments of the invention, including the best mode, and to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method for operating a power system comprising the steps of:

receiving a DC power signal by an inverter;

controlling a power output of the inverter with an inverter controller, the inverter controller comprising a power control portion, a power reserve portion, a power point tracking control portion, and a virtual inertia control portion;

determining, with the power reserve portion, an amount of power to be reserved by the power point tracking control portion;

providing a power reserve signal, indicative of the determined amount of power to be reserved, from the power reserve portion to the power point tracking controller;

determining a power point by the power point tracking control portion that is less than a maximum power point;

providing a power point tracking signal to the power control portion that is indicative of the determined power point;

determining a virtual inertia with the virtual inertia control portion;

providing an inertia command signal indicative of the determined virtual inertia to the power control portion;

providing a power control signal from the power control portion to the inverter, wherein the control signal is based at least in part on the power point tracking signal and the inertia command signal; and operating the inverter based at least in part on the power control signal.

2. The method of claim 1, further comprising electrically coupling the inverter to a power source.

3. The method of claim 2, wherein the power source comprises a photovoltaic (PV) generator.

4. The method of claim 1, further comprising coupling the power system to an electrical load.

5. The method of claim 1, wherein the determining a virtual inertia with the inertia control portion comprises one of determining a variable amount of virtual inertia, and determining a fixed amount of virtual inertia.

6. The method of claim 4, wherein the virtual inertia is determined relative to a full load output of the power system.

7. The method of claim 4, wherein the determining a virtual inertia with the inertia control portion is based at least in part on a signal input to the inertia control portion, wherein the signal input comprises at least one of a first reference signal received from a DC bus; a second reference signal received from the load, and a third reference signal received from the inverter.

8. The method of claim 4, wherein the determining a virtual inertia with the inertia control portion is based at least in part on upon a control signal provided to the virtual inertia control portion by an external controller.

9. The method of claim 1, wherein the determining a power point by the power point tracking control portion is based at least in part on a predetermined value stored in a look-up table.

10. The method of claim 9, wherein the predetermined value is a percentage of the maximum power output of the power system.

11. The method of claim 1, further comprising:
receiving, by the power control portion, a command signal from an external supervisory controller;
wherein the providing a power control signal from the power control portion to the inverter is further based at least in part on the command signal.

12. A virtual synchronous generator system for supplying power to an electrical load, comprising:
a DC-DC converter configured to receive power from a DC power source;
an inverter coupled to the DC-DC converter, arranged to receive a DC signal therefrom and configured to convert the DC signal to and AC signal;
an inverter controller coupled in signal communication to the inverter and configured to control an output of the inverter, the inverter controller comprising: a power point tracking control portion, a power reserve portion, a virtual inertia control portion, and a power control portion, wherein the power point tracking control portion is coupled in signal communication with the power reserve portion and the power control portion; and
wherein
the power reserve portion is configured to determine an amount of power to be reserved and to provide a power reserve signal, indicative of the determined amount of power to be reserved, to the power point tracking control portion;
the power point tracking control portion is configured to determine a power point that is less than a maximum power point for an output of the DC power source, and to provide a power point tracking signal to the power control portion indicative of the determined power point;
the virtual inertia control portion is coupled in signal communication to the power control portion, and configured to determine a virtual inertia, and to provide an inertia command signal indicative of the determined virtual inertia to the power control portion;
the power control portion is configured to provide a power control signal to the inverter, wherein the power control signal is based at least in part on the power point tracking signal and the virtual inertia command signal.

13. The virtual synchronous generator system of claim 12, wherein an output of the inverter is configured to be electrically coupled to an electrical load.

14. The virtual synchronous generator system of claim 12, wherein the virtual inertia is one of a variable amount of virtual inertia and a fixed amount of virtual inertia.

15. The virtual synchronous generator system of claim 13, wherein the virtual inertia is determined relative to a full load output of the power system.

16. The virtual synchronous generator system of claim 13, wherein the inertia control portion is configured to receive a signal input that comprises at least one of a first reference signal received from a DC bus, and a second reference signal received from the load, and a third reference signal received from the inverter.

17. The virtual synchronous generator system of claim 13, wherein the signal input to the inertia control portion further comprises a control signal from an external controller.

18. The virtual synchronous generator system of claim 12, wherein the power point tracking control portion is configured to determine the power point based at least in part on a predetermined value stored in a look-up table.

19. The virtual synchronous generator system of claim 18, wherein the predetermined value is a percentage of the maximum power output of the power system.

20. The virtual synchronous generator system of claim 12, wherein the power control portion is configured to receive a command signal from an external supervisory controller, and wherein the power control signal based at least in part on the command signal.

* * * * *